United States Patent [19]

Nelson et al.

[11] Patent Number: 4,606,982

[45] Date of Patent: Aug. 19, 1986

[54] SEALED LEAD-ACID CELL AND METHOD

[75] Inventors: Robert F. Nelson, London, England; Tristan D. Juergens, Golden, Colo.

[73] Assignee: Gates Energy Products, Inc., Denver, Colo.

[21] Appl. No.: 732,522

[22] Filed: May 9, 1985

[51] Int. Cl.[4] ................. H01M 2/14; H01M 4/20
[52] U.S. Cl. ..................... 429/59; 29/623.3; 429/246
[58] Field of Search ........... 429/57, 59, 60, 94, 429/248, 228, 246; 29/623.1, 623.3

[56] References Cited

U.S. PATENT DOCUMENTS

| | | | |
|---|---|---|---|
| 3,758,340 | 9/1973 | Adams | 429/246 |
| 4,112,202 | 9/1978 | Hug et al. | 429/94 |
| 4,383,011 | 5/1983 | McClelland et al. | 429/94 |
| 4,414,295 | 11/1983 | Uba | 429/59 |

FOREIGN PATENT DOCUMENTS

| | | | |
|---|---|---|---|
| 0029788 | 6/1981 | European Pat. Off. | 429/246 |
| 0601757 | 1/1985 | Japan . | |
| 2129193 | 5/1984 | United Kingdom . | |

Primary Examiner—Donald L. Walton
Attorney, Agent, or Firm—C. H. Castleman, Jr.; H. W. Oberg, Jr.

[57] ABSTRACT

A preferably sealed lead-acid battery having a microfine glass separator pasting paper integrated with its adjoining plate, and the associated method by which the separator pasting paper is applied directly to the freshly pasted plate.

27 Claims, 6 Drawing Figures

SEALED LEAD-ACID CELL AND METHOD

BACKGROUND OF THE INVENTION

This invention relates to normally sealed lead-acid cells of the oxygen recombination type, and more particularly to an integrated plate/separator configuration and the associated method for its production.

Sealed lead-acid batteries of one or more cells operating on the oxygen cycle with internal recombination of oxygen during charge and reasonable overcharge are taught in U.S. Pat. No. 3,862,861 to McClelland et al. These starved electrolyte batteries exhibit unique performance in part by employing an absorptive separator mat preferably of microfine glass fibers having a large surface area per unit of volume and a large porosity, enabling retention of the bulk of the acid electrolyte (capacity determining) of the cell in the separator phase, while leaving a sufficiently thin layer of electrolyte on the active plate surface to sustain internal oxygen recombination within the cell at high efficiencies.

In commercial practice, electrode plates for these cells have been produced by continuously pasting a lead grid with electrochemically active paste material. After the pasted grid exits a pasting nozzle, a cellulosic paper has been applied to the paste to aid in paste spreading, to keep moisture in the plate prior to drying, and to keep the paste contained prior to winding or stacking the plates and interleaved glass mat separator to form a cell pack subassembly. Typically, due to interference of the cellulosic paper with cell/battery performance characteristics, it is removed and discarded prior to assembly. This so-called pasting paper is a nuisance because of its cost, the necessity for proper disposal, and because roughly 2 to 4% of the paste is removed with the paper as it is stripped off the pasted plate. In addition, paper stripping and plate scraping contributes substantially to undesirably high airborne lead dust levels. Representative prior art that discloses the use of such disposable pasting paper and typical pasting methods for sealed lead-acid batteries include U.S. Pat. Nos. 3,814,628 and 3,881,654 to Larkin, 3,894,886 to Pankow et al, 4,050,482 to Ching et al, and 4,318,430 to Perman.

In another prior art method the pasting paper, typically cellulosic, remains on the plates during winding/stacking and subsequent battery assembly, and this paper degrades within the battery during electrochemical formation and subsequent use.

U.S. Pat. No. 4,429,442 to Thomas discloses a method of producing a lead-acid battery plate by supplying active paste to a carrier, contacting the exposed surface of the paste on the carrier with a layer of fibrous material such as glass fiber mat or a randomly oriented, woven or knitted synthetic resin fabric such as polyester, and supplying vibrational energy to the fibrous layer so as to cause the paste to impregnate the fibrous layer and thereby secure the fibrous layer to the plate.

Japanese Patent Appl. No. 55-14133 (Publication No. 56-112070) to Okamoto et al teaches a plate manufacturing method for an enclosed lead battery including the steps of coating a soft lead or lead alloy support with an active paste substance having a high moisture content, sandwiching the pasted plate between acid-resistant porous separator layers made, for example, of a nonwoven glass fiber, and then passing the pasted plate with separator layers through a pair of press rollers, which are provided on their surface with liquid absorbant cloth that absorbs moisture from the separator layers. The plate/separator subassembly may be coiled to form a spiral wound cell.

Reference is also made to U.S. Pat. No. 4,469,145 to Fletcher et al, which discloses use of glass fiber tissues applied on either side of a pasted negative grid to retain the paste in position.

U.S. Pat. No. 4,414,295 to Uba discloses a sealed lead-acid battery using a multilayer microfine glass separator in which the layers positioned against the plates have a relatively high surface area, and a sandwiched glass layer has a relatively low surface area.

It is a primary object of the subject invention to provide a separator pasting paper for sealed lead-acid cells that remains on the plates and is incorporated into the finished cell, thereby avoiding the traditional paper stripping and plate scraping steps associated with disposable pasting papers, to reduce airborne lead dust levels during plate preparation, and to provide a unique separator pasting separator material, which intimately integrates with the adjoining pasted plate, thereby improving ionic transfer during use of the battery, and its high rate performance.

SUMMARY OF THE INVENTION

In one aspect, the invention embraces a normally sealed lead-acid cell of the oxygen recombination type, comprising a cell housing in which is disposed at least one porous pasted positive electrode plate, at least one porous pasted negative electrode plate, a multilayer absorbent porous separator interleaved between the opposite polarity plates, and an electrolyte in a starved amount absorbed in the pores of the plates and separator, said separator including first and second layers, each comprised of a mat of microfine glass fiber of which the average fiber diameter on a weight basis is less than about 5 microns, one face of the first layer being integrated into the adjoining face of the positive plate by having a substantial quantity of its microfine glass fibers embedded in the positive plate material, and the other face of the first layer being free from contact with an electrode plate, and one face of the second layer being integrated into the adjoining face of the negative plate by having a substantial quantity of its microfine glass fibers embedded in the negative paste material, and the other face of the second layer being free from contact with an electrode plate.

In another aspect, the invention is drawn to a method for making a cell pack subassembly for a normally sealed lead-acid cell of the oxygen recombination type, comprising the steps of: forming a continuous length of moist pasted positive plate; while advancing the pasted positive plate, pressing a layer of separator pasting paper against both major faces of the positive plate, whereby the pasting paper layers and plate adhere together to form a positive laminate, the pasting paper being formed of a mat of microfine glass fibers of which the average fiber diameter on a weight basis is less than about 5 microns; forming a continuous length of moist pasted negative plate; while advancing the pasted negative plate, pressing a layer of separator pasting paper against both major faces of the negative plate, whereby the pasting paper layers and plate adhere together to form a negative laminate, the pasting paper being formed of a mat of microfine glass fibers of which the average fiber diameter on a weight basis is less than about 5 microns; and assembling the positive and negative laminates together to form a cell pack subassembly, the pasting paper serving as at least a portion of the separation between plates.

BRIEF DESCRIPTION OF THE DRAWINGS

The invention will be described in part by reference to the accompaning drawings, in which like numerals designate like parts, and in which.

PREFERRED EMBODIMENTS OF THE INVENTION

Figure 1:
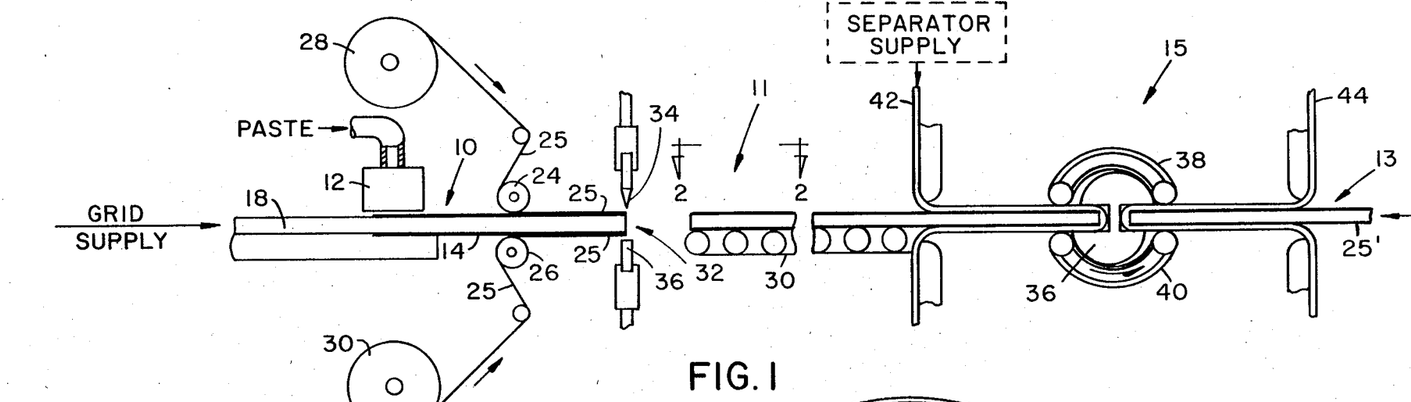
FIG. 1 is a schematic side elevational view illustrating apparatus for pasting and winding plates into a plate/separator subassembly in accordance with one aspect of the invention.
Figure 2:
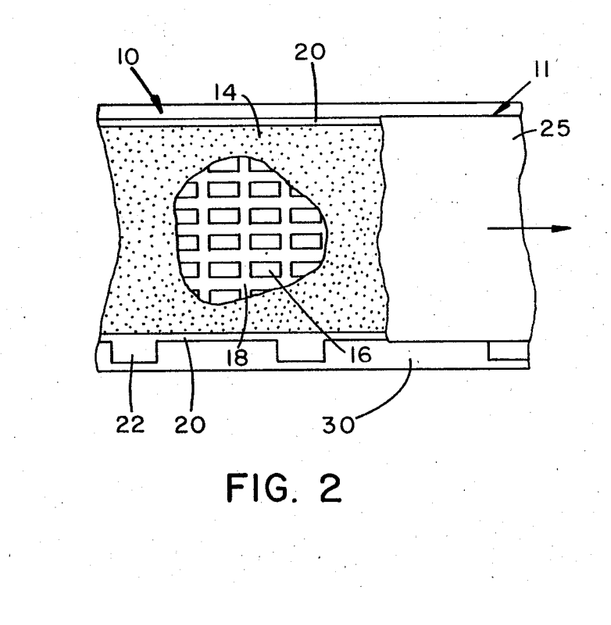
FIG. 2 is plan view partially cut away taken along view 2—2 of FIG. 1.
Figure 3:
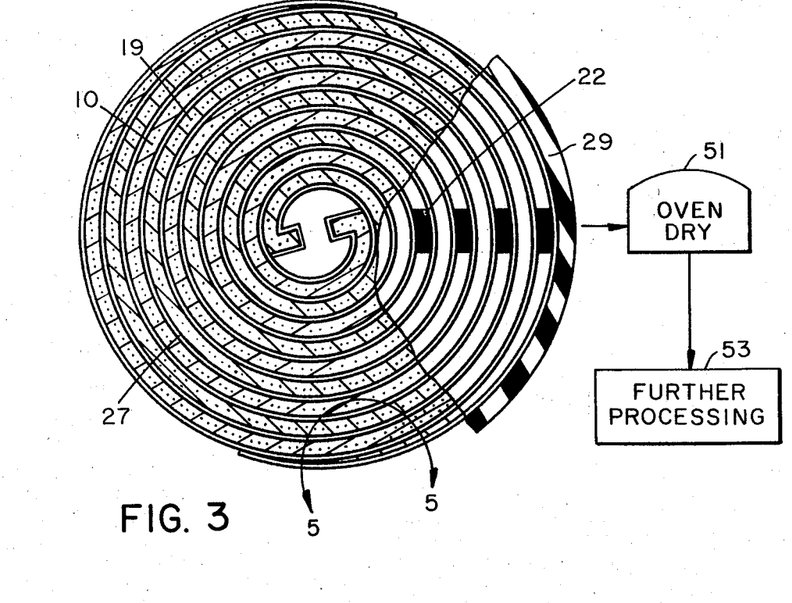
FIG. 3 depicts the wound element produced using the apparatus of FIG. 1, partially in section, and illustrating further processing steps.

Referring first to FIGS. 1 and 2, the positive or negative electrode plate(s), shown generally at 10, may be formed respectively of electrochemically active lead and compounds of lead which, upon electroforming, produce positive plates containing lead dioxide as the electrochemically active material, and negative plates having lead in sponge form as the electrochemically active material. The plates are formed by supplying paste 14 through nozzle 12 onto both sides as well as filling the interstices 16 of grid 18. Grid 18 may be made of cast or wrought lead, for instance formed into a perforated sheet, as shown, or expanded mesh. The lead used for at least the negative grid has a high hydrogen overvoltage and is preferably pure lead of at least 99.9% by weight purity, with the impurities not serving to substantially reduce the hydrogen overvoltage. Alternatively, an alloy of lead of lower purity, naturally having a high hydrogen overvoltage, such as lead/calcium, lead/calcium/tin, or the like may be used. Of course, if it is desired to wind the electrodes into a coiled configuration, such as shown in FIG. 3, one would use the higher purity grid materials for increased pliability and enhanced windability.

The paste material supplied through nozzle 12 is normally viscous and thixotropic, and is at least partially water based to allow pumping and continuous pasting onto the moving grid. The paste is normally supplied such that marginal edges 20 and current collector tabs 22 are substantially free of paste. Alternatively margins 20 may be covered with paste.

Pasted plate 10 is then advanced into the nip of rolls 24, 26 around which separator pasting paper 25, supplied respectively from rolls 28 and 30, is pressed against both the top and bottom (i.e., major faces) of the pasted plate. Sufficient pressure is supplied by rollers 24, 26 to insure that the separator pasting paper 25 and moist paste 14 adhere together to form a laminate sandwich. The surface of rolls 24, 26 should be compressible. This can be accomplished by facing the rolls with a compressible cushion layer formed of natural or synthetic elastomers.

In accordance with the invention pasting paper 25 remains on the pasted plate and becomes a part or all of the separator 27 interleaved between the opposite polarity plates. To achieve the objectives of the invention, and particularly to improve high rate performance of the cell, it has been found that the separator pasting paper 25 must be formed of a mat of intermingled microfine glass fibers, of which the average fiber diameter on a weight basis is less than about 5 microns, more preferably less than about 4 microns and most preferably less than about 3 microns. The mat is normally compressible so that it conforms intimately to the contour of the surface of the plates and performs its wicking or capillary function. Separator compressibility also enables achievement of a firm mutual stacking pressure between the separator and plates. Typically, the mat is formed of a mixture of fibers, a portion of which may exceed 5 microns in diameter so long as the average diameter of the fibers on a weight basis meets the aforementioned criteria. The final fiber mix may also be determined by a combination of desired properties including mat elongation and tensile strength.

A separator pasting paper of this type has a high heat of wetting and absorptive power towards sulfuric acid, because of the nature of glass, and by virtue of the microfine diameter of the glass fibers has a correspondingly large surface area per unit of volume. In addition, the separator pasting paper preferably should have the same properties as conventional glass microfiber separators i.e., pure glass fibers are used with no binders and the porosity (void volume) is generally in the range of 70 to 95%, more preferably from about 80 to 95%. Preferably the pasting paper, if combined with additional layer(s) as in the embodiment of FIG. 5, will be formed of the microfine glass fibers in accordance with the invention and will have a corresponding surface area of at least about 1.5 $m^2/g$ of glass, more preferably at least about 2.0 $m^2/g$ of glass, and most preferably from about 2.1 to about 3.0 $m^2/g$ of glass.

Figure 6:
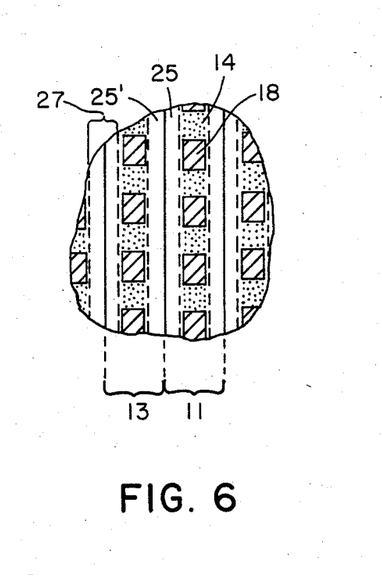
FIG. 6 is a view similar to FIG. 5 of the flat plate cell pack of FIG.4.

On the other hand, in the situation where all the separator is applied at pasting as in the FIG. 6 embodiment, the glass paper of at least one of the layers 25, 25' will be formed of microfine glass fibers having a corresponding surface area of preferably from about 0.3 to about 1.7 $m^2/g$ of glass, more preferably from about 0.4 to about 1.2 $m^2/g$ and most preferably from about 0.4 to about 0.8 $m^2/g$ of glass. Surface area may be measured using the BET method.

After the microfine glass fibers of mat 25 are pressed into the pasted plate 10 to form a laminate, the laminate is advanced to a conveyor 30 and after indexing a desired length, cut to length at 32 by cutter element 34, which reciprocally acts against an anvil 36, in known manner. If desired, a slack loop between applicator rolls 24 and the cut off mechanism may be employed to permit continuous paste application. At this point, the laminate, generally shown at 11, may be assembled with opposite polarity laminates, with or without additional separator interposed between the laminates, to form a parallel plate stack (prismatic) battery, for instance of the type shown in FIG. 4, which will be discussed more fully hereafter. Alternatively, in the event it is desired to form a coil of spiral wound plates and separators of the type shown in FIG. 3, laminate 11 is placed on winding station shown at 15 together with opposite polarity laminate 13 (e.g., laminate 11 may be the negative laminate, and laminate 13 the positive electrode laminate)

advanced from the opposite direction to winding head 15.

The winding head 15 is of the driven mandrel type more fully disclosed in U.S. Pat. No. 4,212,179 to Juergens, which is hereby incorporated by reference. In general, the opposite polarity laminates 11, 13 are introduced into opposed slots formed in mandrel 36, and then the mandrel is rotated counterclockwise and belt members 38, 40 are retracted as the spiral element is wound to its final dimension depicted in FIG. 3. If less than all of the separator was applied at the paster as separator pasting paper 25, optionally additional separator layers 42, 44 cut to the appropriate length, may be wrapped around the leading edges of the respective opposite polarity laminates 11 and 13, and then wound together resulting in the four layered separator shown in the embodiment of FIG. 5. As a further option, only one of layers 42 or 44 could be supplied, thereby forming a three layered separator. Obviously, other configurations could be employed.

Figure 5:
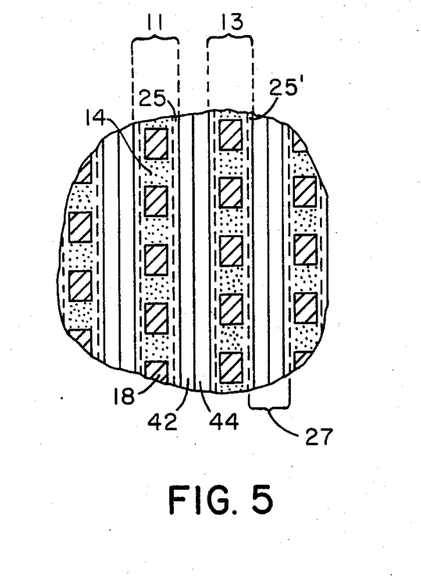
FIG. 5 is a partial side elevation view showing the plate separator stack of the element of FIG. 3.

In the embodiment of FIG. 5 wherein additional separator layers 42 and 44 are interposed between the separator pasting layers 25, it is preferred that the separator pasting layers 25 be as thin as possible and still accomodate processing of the pasted plates. Typically, in this embodiment, layers 25 are from about 0.002 to about 0.010, more preferably from about 0.002 to about 0.008 inches thick. This thin pasting paper layer may be considered as at least partially sacrificial because it may be stretched, torn, or otherwise deformed, generally in a uniform manner, during pasting and/or winding/stacking. It has been found that such stretching, tearing, or other deformation of the thin pasting paper layer does not adversely affect the operation of the battery. The important thing is that the bulk of the surface fibers of layer 25 at the interface with the adjoining electrode plate has its fibers embedded in the paste of that electrode so as to be fully integrated together. Typically, the glass fibers may be embedded into the paste of the adjoining plate at least 0.001 inches and preferably will be embedded to a depth of at least 0.002 inches (measured along the length of the embedded fiber). These embedded fibers serve as a capillary link between the active particle surfaces of the electrode plates and the separator, the separator serving as the reservoir of the bulk of the electrolyte needed for the discharge reaction of a lead-acid battery. Thus, intermediate layer or layers 42, 44 will have an aggregate thickness, which is preferably at least 2 times the thickness of the aggregate thickness of pasting paper layers (25 plus 25') in the interelectrode gap, and more preferably at least 4 times the thickness of such pasting paper layers. This ratio of widths will normally hold true both prior to assembly of the cell as well as after assembly and compression between the electrodes.

In the multilayer separator embodiment of FIG. 5, where separator 27 is composed of pasting layers 25, 25' and at least one additional intermediate layer 42,44, it is preferred that the intermediate layer have (by itself before assembly) an elongation (machine direction) of at least about 2 percent, more preferably at least about 3.5 percent as measured by an Instron Tensile Tester using as a basis ASTM Standard D828 and TAPPI Standard T494. It is also preferred that the intermediate layer have a greater elongation than either of pasting layers 25, 25'. The ability of the intermediate layer to undergo elongation during winding or stacking is particularly important to ensure that the prime electrolyte retention component between the plates is substantially uniform (free of tears or other major discontinuities), thereby promoting more uniform current densities throughout the plates during use.

In the alternative embodiment shown in FIG. 6 where all of the separator is applied at the paster as separator pasting paper 25, the supplemental layers 42 and 44 are dispensed with, and the laminates 11 and 13 may be directly coiled together whereby separator 27 of FIG. 3 is composed of the back-to-back pasting paper layers 25, 25' which are integrated and adhered to their adjoining opposite plate electrodes. In this embodiment it is highly preferred that layers 25, 25' have the same minimum elongations of 2 percent, more preferably 3.5 percent as specified above for layer(s) 42,44.

In the spiral wound embodiment of FIG. 3, separator 27 is sandwiched in pressure contact between opposite polarity plates 10, 19. The wound subassembly is then stuffed into a container 29, either before or after drying in oven 51. After drying, the cell is completed at 53 by known further operations including welding common polarity tabs 22 together, installing a lid, electrolyte filling, making terminal connections, sealing, formation, etc. It is preferred that substantially all the drying of the cell pack subassembly take place in the oven 51, and that no artificial means are used to remove moisture from the plates or separator pasting paper before the plates and separators are wound together (or stacked as in FIG. 4). This ensures a uniform drying of the entire cell pack subassembly in the drying oven. Typically the subassembly is heated in the oven at from about 50° to about 80° C. for a period from about 10 to about 50 hours to effect uniform drying, although time and temperature will be selected based on cell/battery size and other factors.

Figure 4:
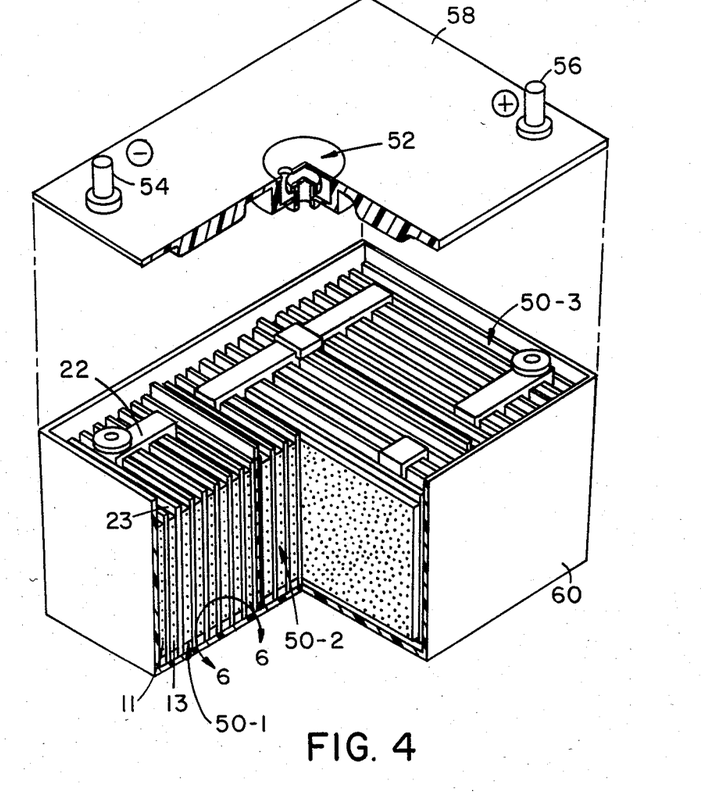
FIG. 4 illustrates an alternative battery configuration produced in accordance with the method of the invention.

FIG. 4 depicts a typical parallel plate prismatic battery, details of which may be gleaned more fully from U.S. Pat. No. 4,383,011 to McClelland et al, hereby incorporated by reference. These details are not pertinent to the invention. Generally speaking, the pasting paper layers 25, 25' are made wider than the pasted plate, however, not as wide as tab members 22, thereby producing separator overhang 23 to help prevent shorting. The parallel plate battery, as shown, has three series connected cells 50-1, 50-2, and 50-3. The battery is provided with an intercommunicating gas space, which communicates with the exterior only upon opening of valve assembly 52, equipped with a normally sealed but resealable Bunsen valve. The battery has negative and positive terminals 54, 56 protruding in a sealed fashion through lid member 58, which is in turn sealed to container 60. The electrolyte is substantially fully absorbed within each of the cell packs consisting of positive and negative laminates 11, 13 in mutual pressure contact within each of the respective cells.

As will be readily appreciated, the invention also applies to batteries in which the individual cells are sealed in gas tight manner and each cell is equipped with its own valve assembly 52.

FIGS. 5 and 6 each depict, in dotted lines, the interface between the separator pasting paper and the adjoining pasted plate. This is to signify that the plate and separator pasting paper at this interface are integrated together with mutual penetration of each element into one another. However the opposite side of the pasting separator layer, remote from the plate interface is free from contact with any electrode plate, and abutts against the corresponding back-face of the other separator pasting layer as in FIG. 6 or against an intermediate interposed separator layer, as in FIG. 5. At this remote interface, the layers will be free to move somewhat one relative to the other, and this is beneficial in winding of wound cells, and in respect to growth of the positive active material during cycling in the cell of wound configuration, prismatic configuration, or any other desired configuration.

In an actual test control cells and cells made in accordance with the invention were built and their performance compared. All cells were spirally wound, sealed lead-acid batteries of the general configuration disclosed in FIG. 1 of U.S. Pat. No. 3,862,861, having a nominal capacity of 25 A.H. at the 10 hour rate. The plates were 36" long using 0.022" thick high purity lead grid, and positive and negative partially water-based, pumpable pastes. All cells used the same separator (Grade 9063, C. H. Dexter, Co., Windor Locks, Conn.) having a nominal thickness of 0.017". The width of the separator layers used in the control cells was 5.3", and the width of the separator (pasting paper) layers for the cells of the invention was 5.5" as applied, later trimmed to about 5.3". Two layers of 9063 were compressed between the opposite polarity plates. Sulfuric acid electrolyte was introduced into the cells and absorbed in the plates and separators, in a starved amount (less than saturated) and all cells sealed and finally subjected to a formation to convert the plate materials to active form.

In the control cells the separator was applied after the plates were pasted and allowed to dry partially (about 1-12 hrs) so as not to be tacky. After winding, as shown at 15 in FIG. 1, it was found that the separator was not adhered to the adjoining plates.

In the cells of the invention, all of the separator was applied immediately after pasting as pasting paper (at 25, FIG. 1), and the separator was found to be adhered to and integrated fully with the plates and having the configuration shown in FIG. 6. There were no other differences between control cells and cells of the invention.

Two groups of test/control cells were performance tested and the results compared with the first group. All cells were first checked for open circuit voltage, then subjected to an HRLT (high rate, low temperature discharge: 10C rate at −20° F.), followed by a discharge at the C/5 (5 hour) rate, another HRLT discharge, and lastly a cold crank discharge (440 amps at −1° F. to 1.5 and 1.2 volts). All cells exhibited comparable open circuit voltages of about 2.19 v. Of the 10 control cells tested, the average first HRLT, C/5 discharge and second HRLT was, respectively, 52 seconds, 5.0 hours and 57 seconds compared to the 12 cells of the invention which similarly yielded, respectively, 60 seconds, 5.2 hours and 63 seconds. Three control cells and three cells of the invention also were subjected to the cold crank test with the control cells averaging 11.3 seconds discharge time to the 1.5 v. level and 25.3 seconds to 1.2 v. In comparison the cells of the invention yielded 18 seconds to 1.5 v. and 31.3 seconds to 1.2 v.

In the second group there were nine control cells and 30 cells of the invention. The same tests were run as with the first group of cells as above except that no cold crank test was conducted. The controls yielded an average of 36 seconds for the first HRLT, 4.9 hours for the C/5 discharge and 44 seconds for the second HRLT. In comparison, the cells of invention yielded 54 seconds for the first HRLT, 5.5 hours for the C/5 discharge and 59 seconds for the second HRLT.

While certain representative embodiments and details have been shown for the purposes of illustrating the invention, it will be apparent to those skilled in this art that various changes and modifications may be made therein without departing from the spirit or scope of the invention. For instance, while the specific embodiments of FIGS. 5 and 6 illustrate symmetrical separator configurations, clearly asymmetrical arrangements could be used e.g., a plate(s) could have a thin, low elongation separator pasting paper layer on one surface, and a relatively thick, high elongation separator pasting paper layer on the other surface. Various combinations of separator layers may be used, some applied at pasting, some applied subsequently. Furthermore the method of the invention has broad application to nonsealed as well as sealed lead-acid batteries.

What is claimed is:

1. A normally sealed lead-acid cell of the oxygen recombination type comprising a cell housing, in which is disposed at least one porous pasted positive electrode plate made from a thixotropic paste, at least one porous pasted negative electrode plate made from a thixotropic paste, a multilayer absorbent porous separator interleaved between the opposite polarity plates and an electrolyte in a starved amount absorbed in the pores of the plates and separator, said separator including first and second layers, each comprised of a mat of microfine glass fibers, of which the average fiber diameter on a weight basis is less than about b 5 microns, one face of the first layer being integrated into the adjoining face of the positive plate by having a substantial quantity of its microfine glass fibers embedded in the positive paste material, and the other face of the first layer being free from contact with an electrode plate, and one face of the second layer being integrated into the adjoining face of the negative plate by having a substantial quantity of its microfine glass fibers embedded in the negative paste material, and the other face of the second layer being free from contact with an electrode plate.

2. The lead-acid cell of claim 1 wherein the separator includes a third layer, interposed between the first and second layers.

3. The lead-acid cell of claim 2 wherein the third layer is comprised of a mat of microfine glass fibers of which the average fiber diameter on a weight basis is less than about 5 microns and the mat by itself having an elongation of at least about 2 percent.

4. The lead-acid cell of claim 3 wherein the elongation of the third layer is greater than the elongation of the first and second layers.

5. The lead-acid cell of claim 3 wherein said third layer has a thickness which is at least twice the aggregate thickness of said first and second layers.

6. The lead-acid cell of claim 3 wherein the surface area of the third layer, expressed in square meters per gram, is substantially less than the surface area of at least one of the first and second layers.

7. The lead-acid cell of claim 2 wherein the separator includes a fourth layer, interposed between the first and second layers.

8. The lead-acid cell of claim 2 wherein at least one of said first and second layers is embedded into its adjoining plate to a minimum depth of about 0.002".

9. The lead-acid cell of claim 1 wherein the fibers of the first and second layers have an average diameter on a weight basis of less than about 3 microns.

10. A method for making a cell pack subassembly for a normally sealed lead-acid cell of the oxygen recombination type, comprising the steps of:

forming a continuous length of moist thixotropic pasted positive plate;

while advancing the pasted positive plate, pressing separator pasting paper against both major faces of the positive plate while the positive plate is still moist and prior to drying thereof whereby the pasting paper layers and plate integrate and adhere together to form a positive laminate, the pasting paper being formed of a mat of microfine glass fibers of which the average fiber diameter on a weight basis is less than about 5 microns, and a substantial quantity of such microfine glass fibers embedding in the positive plate paste;

forming a continuous length of moist thixotropic pasted negative plate;

while advancing the pasted negative plate, pressing a layer of separator pasting paper against both major faces of the negative plate while the negative plate is still moist and prior to drying thereof whereby the pasting paper layers and plate integrate and adhere together to form a negative laminate, the pasting paper being formed of a mat of microfine glass fibers of which the average fiber diameter on a weight basis is less than about 5 microns, and a substantial quantity of such microfine glass fibers embedding in the negative plate paste;

assembling at least a portion of the positive and negative laminates together to form a cell pack subassembly, the pasting paper serving as at least a portion of the separation between plates.

11. The method of claim 10 wherein as a result of said pressing step the pasting paper absorbs and retains moisture from the adjoining paste, and wherein no artificial means are employed to remove that moisture prior to said assembling step.

12. The method of claim 11 wherein after assembling, the cell pack subassembly is heated at a temperature of from about 50° to about 80° C. for a period from about 10 to about 50 hours to effect drying thereof.

13. The method of claim 10 wherein at least a portion of the positive and negative laminates are assembled by winding together into a coil.

14. The method of claim 13 wherein at least one additional separator layer is interposed between the positive and negative laminates before winding together, the additional separator layer being formed of a mat of microfine glass fibers having an elongation of at least 2 percent.

15. The method of claim 14 wherein the additional separator layer has a greater elongation than either of the separator pasting paper layers applied to the positive and negative plates, respectively.

16. The method of claim 10 wherein at least a portion of the positive and negative laminates are assembled by stacking together into a prismatic configuration.

17. The method of claim 10 wherein pressing is accomplished with juxtaposed rollers having a compressible surface thereon.

18. A cell made according to the method of claim 10.

19. The method of claim 10 wherein the separator pasting paper is pressed into an advancing positive or negative plate substantially immediately after production of the pasted plate.

20. A normally sealed lead-acid cell of the oxygen recombination type comprising a cell housing, in which is disposed at least one porous pasted positive electrode plate made from a thixotropic paste, at least one porous pasted negative electrode plate made from a thixotropic paste, a multilayer absorbent porous separator interleaved between the opposite polarity plates, and an electrolyte in a starved amount absorbed in the pores of the plates and separator, said separator including at least one layer comprised of a mat of microfine glass fibers, of which the average fiber diameter on a weight basis is less than about 5 microns, one face of the first layer being integrated into the adjoining face of one of the opposite polarity plates by having a substantial quantity of its microfine glass fibers embedded in the paste material, and the other face of the layer being free from contact with an electrode plate.

21. A method for making a cell pack subassembly for a lead-acid cell, comprising the steps of:

forming a length of moist thixotropic pasted plate of first polarity;

pressing separator pasting paper against both major faces of the plate while the plate is still moist and prior to drying thereof whereby the pasting paper layers and plate integrate and adhere together to form a laminate, the pasting paper being formed of a mat of microfine glass fibers of which the average fiber diameter on a weight basis is less than about 5 microns, and a substantial quantity of such microfine glass fibers embedding in the plate paste;

assembling at least a portion of the laminate and a plate of second polarity together to form a cell pack subassembly, the pasting paper serving as at least a portion of the separation between plates.

22. A cell made in accordance with the method of claim 21.

23. The method of claim 21 wherein at least one additional separator layer is interposed between the laminate and plate of second polarity, the additional separator layer being formed of a mat of microfine glass fibers having an elongation of at least two percent and the elongation of this additional separator layer exceeds the elongation of the separator pasting paper layer applied to the plate of first polarity.

24. A method for making a cell pack subassembly for a lead-acid cell, comprising the steps of:

forming a lead-based grid having openings therein;

advancing the grid through a pasting zone, and applying thixotropic paste of first polarity into the openings and on both major faces of the grid to form a pasted plate of first polarity;

substantially immediately after pasting of said grid, while the pasted plate is still moist and prior to drying thereof, pressing separator pasting paper against both major faces of the plate, whereby the pasting paper layers and plate integrate and adhere together to form a laminate, the pasting paper being formed of a mat of microfine glass fibers of which the average fiber diameter on a weight basis is less than about 5 microns;

forming a length of moist pasted plate of second polarity; and assembling at least a portion of the laminate and plate of second polarity together to form a cell pack subassembly, the pasting paper serving as at least a portion of the separation between plates.

25. The method of claim 24 wherein as a result of said pressing step, the pasting paper absorbs and retains moisture from the adjoining paste, and wherein no artificial means are employed to remove that moisture prior to said assembling step.

26. A cell made from the cell pack subassembly made in accordance with the method of claim 24.

27. The cell of claim 26 wherein said pasting paper layer is embedded into its adjoining plate by having glass fibers penetrating into the plate a minimum depth of about 0.002".

* * * * *

UNITED STATES PATENT OFFICE
CERTIFICATE OF CORRECTION

PATENT NO. : 4,606,982

DATED : Aug. 19, 1986

INVENTOR(S) : Robert F. Nelson, Tristan D. Juergens

It is certified that error appears in the above-identified patent and that said Letters Patent are hereby corrected as shown below:

Column 3, line 6, "accompaning" should be --accompanying--.

Column 5, line 25, "accomodate" should be --accommodate--.

Column 8, Claim 1, line 31, "b 5" should be --5--.

Signed and Sealed this

Fourth Day of November, 1986

[SEAL]

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,606,982

DATED : August 19, 1986

INVENTOR(S) : Robert F. Nelson et al.

It is certified that error appears in the above-identified patent and that said Letters Patent is hereby corrected as shown below:

Column 3, line 6, "accompaning" should read -- accompanying --

Column 5, line 25, "accomodate" should read -- accommodate --.

Signed and Sealed this

Twentieth Day of January, 1987

Attest:

DONALD J. QUIGG

*Attesting Officer*   *Commissioner of Patents and Trademarks*